US009071707B2

(12) United States Patent
Amano et al.

(10) Patent No.: US 9,071,707 B2
(45) Date of Patent: Jun. 30, 2015

(54) DEVICES AND METHODS FOR ACQUIRING MODEL INFORMATION OF A PERIPHERAL DEVICE BY A COMPUTER

(75) Inventors: Maki Amano, Suwa (JP); Mitsuaki Teradaira, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 13/421,798

(22) Filed: Mar. 15, 2012

(65) Prior Publication Data

US 2012/0236352 A1    Sep. 20, 2012

(30) Foreign Application Priority Data

Mar. 18, 2011    (JP) .................................. 2011-061053

(51) Int. Cl.
G06F 3/12        (2006.01)
H04N 1/00       (2006.01)
H04N 1/32       (2006.01)

(52) U.S. Cl.
CPC ....... H04N 1/00204 (2013.01); H04N 1/00278 (2013.01); H04N 1/32106 (2013.01); H04N 2201/0044 (2013.01); H04N 2201/0046 (2013.01); H04N 2201/0082 (2013.01); H04N 2201/3205 (2013.01); H04N 2201/3278 (2013.01); H04N 2201/328 (2013.01)

(58) Field of Classification Search
CPC .................................. G06F 3/12; G06K 15/02
See application file for complete search history.

(56) References Cited

U.S. PATENT DOCUMENTS

| 7,359,965 | B2  |   | 4/2008  | Motoyama et al. |         |
|-----------|-----|---|---------|-----------------|---------|
| 7,519,729 | B2  | * | 4/2009  | Motoyama et al. | 709/237 |
| 2004/0153532 | A1 | * | 8/2004  | Hosotani et al. | 709/222 |
| 2011/0312361 | A1 | * | 12/2011 | Nair et al.     | 455/509 |

FOREIGN PATENT DOCUMENTS

JP    2003-303303 A    10/2003
JP    2004-152030 A    5/2004

* cited by examiner

Primary Examiner — Fred Guillermety
Assistant Examiner — Henok A Shiferaw
(74) Attorney, Agent, or Firm — Kilpatrick Townsend & Stockton LLP

(57) ABSTRACT

Device and methods for acquiring by a host device model information (model ID) of a device assigned in a new range are provided herein. In many embodiments, the device includes a model information storage unit that stores model information from either a first range or a second range outside the first range and a communication unit that communicates with a device that requests model information, receives a model information request, and in response returns the model information if within the first range and returns specific information if the model information is outside the first range. After the specific information is sent, a new request is sent from the host device after which the communication unit provides the model information within the second range, often in a different format from the specific information.

20 Claims, 3 Drawing Sheets

DEVICES AND METHODS FOR ACQUIRING MODEL INFORMATION OF A PERIPHERAL DEVICE BY A COMPUTER

This application claims priority to Japanese Patent Application No. 2011-061053, filed Mar. 18, 2011, the entirety of which is incorporated by reference herein.

BACKGROUND

1. Technical Field

The present invention relates to technology for communicating model information between devices.

2. Related Art

Devices such as printers, scanners, and multifunction devices, commonly known as peripheral devices, are generally used connected to a computer or other control device, commonly called a host device. The host device controls the peripheral devices according to the types of peripheral devices that are connected to the host. As a result, the host device must get the model information (identification information) assigned to each peripheral device before the peripheral devices can be controlled. Note that the model identifier (model ID) as used herein is information identifying the type and model of each device.

Technology enabling the host device to acquire the identification information assigned to the peripheral devices is taught in Japanese Unexamined Patent Appl. Pub. JP-A-2004-185635, for example. This technology is described below. First, an information processing device communicates to acquire the identifier of a network-connected peripheral device. The peripheral device then responds to this communication using an ID number, device type, or other information.

However, the length of the model ID assigned to each peripheral device is generally fixed, and the practical utility of the model ID is therefore limited. For example, if the model ID is 7 bits long, the range of numbers that can be used as a model ID is 0 to 127. While this enables assigning a new model ID to 128 models, a new model ID cannot be assigned if there are 129 models or more. The host device and peripheral devices also communicate the model ID using a specified format. If a model ID is assigned to a new model using a new format with a longer model ID, the format of the model ID will differ between new models and old models. Such different formats can lead to model ID recognition errors by the host device. In addition, in order to accommodate different formats, the configuration of the devices with different formats must generally be changed, thus increasing the burden on the product designer and administrator.

SUMMARY

The present invention provides devices and methods for assigning and enabling the host device to acquire model information (model ID), and in particular model information within a new range of values.

One aspect of the invention is a printing device capable of communicating with a computer and including: a print unit; a model information storage unit that stores model information for the printing device; a communication unit that receives a model information transmission request from the computer; and a control unit that sends the model information through the communication unit to the computer in a first format in response to the transmission request, and when the model information exceeds a specific range, sends specific information in the first format indicating there is model information outside the specific range in response to the transmission request.

In a printing device according to another aspect of the invention, the control unit sends the specific information in part of the part assigned to the model information in the first format when the model information is outside the specific range.

In a printing device according to another aspect of the invention, the first format is a fixed length, and the model information outside the specific range has a variable length.

In a printing device according to another aspect of the invention, the control unit sends model information outside the specific range when the communication unit receives a transmission request for model information outside the specific range from the computer after sending the specific information.

In a printing device according to another aspect of the invention, the control unit sends the model information outside the specific range in a second format that is different from the first format.

Another aspect of the invention is a reading device capable of communicating with a computer and including: a model information storage unit that stores model information for the reading device; a communication unit that receives a model information transmission request from the computer; and a control unit that sends the model information through the communication unit to the computer in a first format in response to the transmission request, and when the model information exceeds a specific range, sends specific information in the first format indicating there is model information outside the specific range in response to the transmission request.

Another aspect of the invention is a multifunction device that can communicate with a computer, and includes: a recording unit; a reading unit; a model information storage unit that stores model information for the reading device; a communication unit that receives a model information transmission request from the computer; and a control unit that sends the model information through the communication unit to the computer in a first format in response to the transmission request, and when the model information exceeds a specific range, sends specific information in the first format indicating there is model information outside the specific range in response to the transmission request.

Another aspect of the invention is a method of controlling a printing device that has a print unit and is capable of communicating with a computer, including steps of: receiving a transmission request for printing device model information from the computer; sending the model information in a first format when the model information is within a specific range; and sending specific information in the first format indicating there is model information outside the specific range when the model information is outside the specific range.

In another aspect of the invention, the method of controlling a printing device also has a step of assigning the specific information, the specific information recorded on a part of the portion of the memory assigned to the model information, and sending the specific information to the computer in the first format when the model information is outside the specific range.

In another aspect of the invention, the method of controlling a printing device also has a step of sending model information outside the specific range when a transmission request for model information outside the specific range is received from the computer after sending the specific information.

In a method of controlling a printing device according to another aspect of the invention, the first format is a fixed length, and the model information outside the specific range has a variable length.

In a method of controlling a printing device according to another aspect of the invention, model information outside the specific range is sent in a second format that is different from the first format.

Another aspect of the invention is a method of controlling a reading device that has a reading unit and is capable of communicating with a computer, including steps of: receiving a transmission request for reading device model information from the computer; sending the model information in a first format when the model information is not outside a specific range; and sending specific information in the first format indicating there is model information outside the specific range when the model information is outside the specific range.

Another aspect of the invention is a method of controlling a multifunction device that has a recording unit and a reading unit and is capable of communicating with a computer, including steps of: receiving a transmission request for multifunction device model information from the computer; sending the model information in a first format when the model information is not outside a specific range; and sending specific information in the first format indicating there is model information outside the specific range when the model information is outside the specific range.

The invention enables assigning model information (model ID) in a new range of values, and enables a host device to acquire model information in the new range.

Other objects and attainments together with a fuller understanding of the invention will become apparent and appreciated by referring to the following description and claims taken in conjunction with the accompanying drawings.

DESCRIPTION OF EMBODIMENTS

Figure 1:
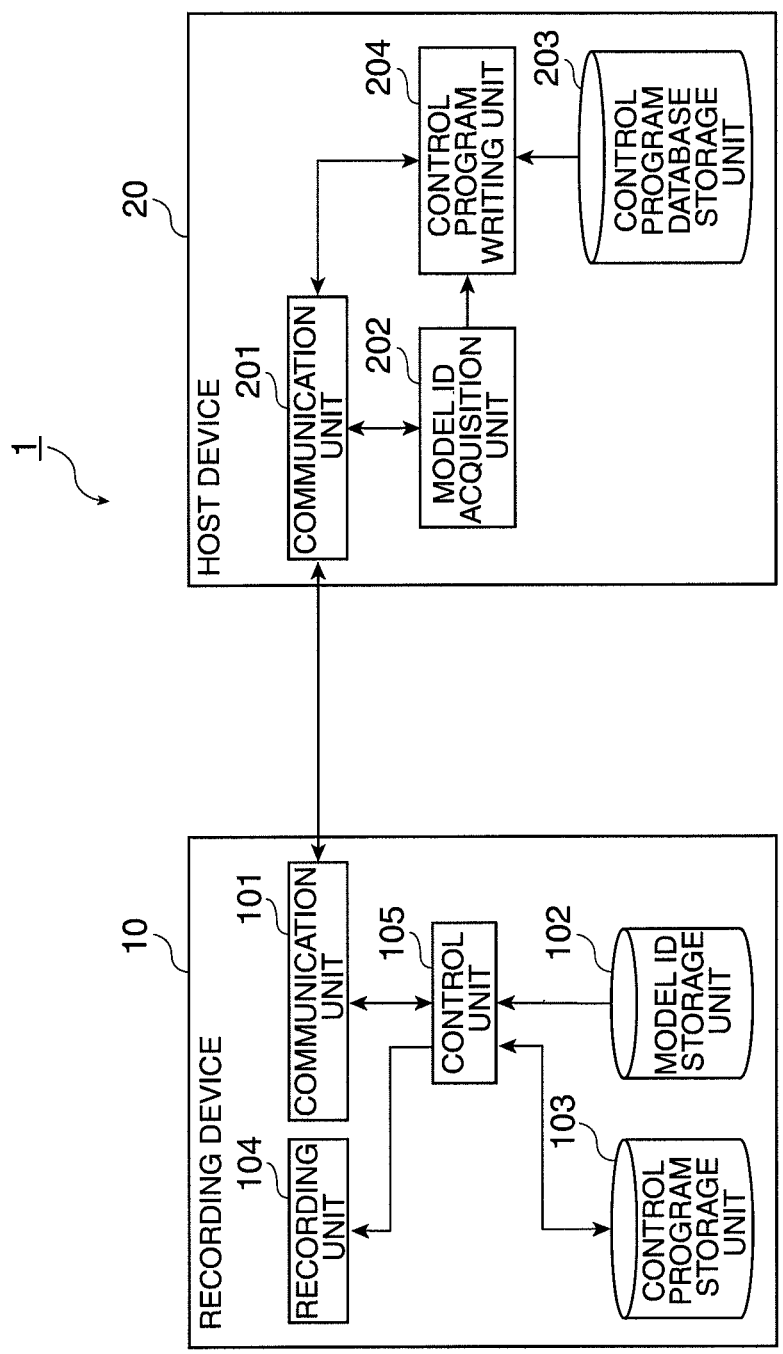
FIG. 1 is a block diagram showing the configuration of a recording system 1.

FIG. 1 shows the configuration of a recording system 1 according to a preferred embodiment of the invention. The recording system 1 is described briefly first.

The recording system 1 includes a recording device 10 such as a printer, and a host device 20 such as a computer. The recording device 10 and host device 20 are both capable of two-way communication. A model ID is assigned to the recording device 10, and the host device 20 executes processes on the recording device 10 according to the model ID. The model ID is identification information describing the type and model of the recording device 10. Generally, a given recording device 10 is assigned a unique model ID.

The recording device 10 records numbers and data on a recording medium according to command information received from the host device 20 and/or command information input directly to the recording device 10 by the user. The recording device 10 could be a printer (printing device) that uses paper or other sheet medium as the recording medium, and prints on the recording medium using an ink ribbon or ink stored in an ink tank, for example. The recording device 10 could also be a multifunction device that uses a magnetic hard disk drive or semiconductor storage device as the recording unit that records to the recording medium, and uses a scanner as a reading unit that reads text and images from the surface of the recording medium. The recording device 10 could also be a multifunction device having a print unit and a recording unit. Providing a storage device as a recording unit is not always necessary, particularly when the recording device 10 is configured with a scanner or reading device. Also, the recording device 10 can be configured to send the data read by the reading unit to the host device 20. The storage medium used in the host device 20 may also be the recording medium to which data is recorded. A printing process or recording process is performed by the recording unit 104.

The host device 20 acquires the model ID assigned to the recording device 10 from the recording device 10, and controls the recording device 10 based on the model ID. The host device 20 could be configured using a personal computer, smartphone, or other general purpose information processing device, or it could be configured using an information processing device dedicated to a specific application, such as a POS (point of sale system) terminal.

In this embodiment of the invention the specific process the host device 20 performs after acquiring the model ID from the recording device 10 is a process that overwrites the control program stored in the recording device 10. However, this process is only one example, and the process the host device 20 performs after acquiring the model ID from the recording device 10 may also configure other settings, for example, any of the settings associated with the printing unit, recording unit, or other such device.

These devices are described in detail below.

The recording device 10 has a CPU (central processing unit; control unit), memory, and auxiliary storage devices connected by a bus, and a control unit 105 that executes a control program. A communication unit 101, model ID storage unit 102, control program storage unit 103, and recording unit 104 are controlled by the control unit 105 configured to execute the control program. Note that all or part of the functions of the recording device 10 can be performed using such hardware as an ASIC (application specific integrated circuit), PLD (programmable logic device) or FPGA (field programmable gate array) device. Typically, the control program is stored on a recording medium that is readable by a CPU or computer. The computer-readable recording medium could be a floppy disk, magneto-optical disc, ROM, CD-ROM or other removable media, or a recording device such as a hard disk drive that is built into a computer system.

The communication unit 101 communicates with the host device 20 by wired or wireless communication to send and receive data. Examples of wired communication include but are not limited to a LAN (Local Area Network), RS-232C (Recommended Standard 232 version C), or USB (Universal Serial Bus) cable. Examples of wireless communication include but are not limited to a wireless LAN, infrared communication, or Bluetooth.

The model ID storage unit 102 is configured with a storage device such as a magnetic hard disk drive or semiconductor storage device that stores the model ID assigned to the recording device 10.

The control program storage unit 103 is configured using a storage device such as a magnetic hard disk drive or semiconductor storage device. The control program storage unit 103 stores the control program enabling the control unit 105 to operate. Typically, the control program stored by the control program storage unit 103 is overwritten by the control unit 105 to upgrade the program, for example, as controlled by a command from the host device 20.

The recording unit 104 records. More specifically, the recording unit 104 records numbers and data on the recording medium according to commands received from the host device 20 or commands input to the recording device 10 directly by the user.

The control unit 105 operates according to the control program stored by the control program storage unit 103.

The host device 20 has a CPU, memory, and auxiliary storage devices not shown connected by a bus, and is configured to execute a management program. The host device 20 functions as a device having a communication unit 201, model ID acquisition unit 202, control program database storage unit 203, and control program writing unit 204 as a result of the CPU executing the management program. Note that all or part of the functions of the host device 20 can be performed using such hardware as an ASIC, PLD or FPGA device. Typically, the management program is recorded on a computer-readable recording medium.

The communication unit 201 communicates with the recording device 10 by wired or wireless communication to send and receive data. Examples of wired communication include but are not limited to a LAN, RS-232C, or USB cable. Examples of wireless communication include but are not limited to a wireless LAN, infrared communication, or Bluetooth.

The model ID acquisition unit 202 gets the model ID of the recording device 10 by communicating with the recording device 10. The model ID acquisition unit 202 also acquires the model ID of the recording device 10 based on the second response information when second response information is received from the recording device 10. Specific steps in this process, in accordance with many embodiments, are described below.

The control program database storage unit 203 is rendered using a storage device such as a magnetic hard disk drive or semiconductor storage device. The control program database storage unit 203 stores a control program corresponding to the type of recording device 10. More specifically, the control program database storage unit 203 stores a control program corresponding to the device type expressed by the model ID for each of a plurality of model IDs.

The control program writing unit 204 reads a control program corresponding to the model ID acquired by the model ID acquisition unit 202 from the control program database storage unit 203. The control program writing unit 204 then sends the read control program to the recording device 10, which updates the control program stored in the control program storage unit 103 of the recording device 10.

Figure 2:
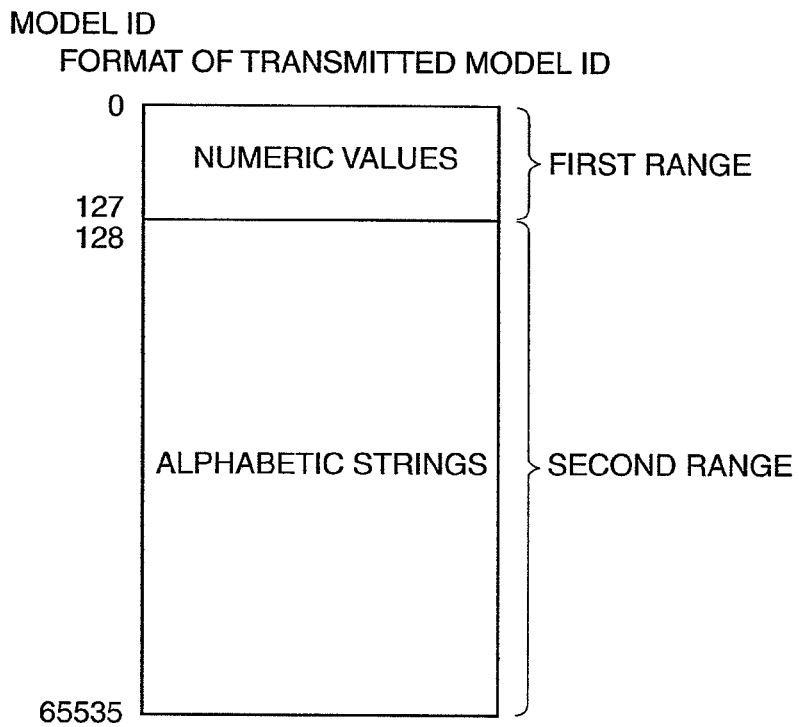
FIG. 2 describes the model ID in detail.

FIG. 2 describes the format of the communicated model ID, in accordance with many embodiments. The model ID is described in detail below.

In many embodiments, the model ID has at least two value ranges separated by a specific value. One of these value ranges is referred to below as a first range, and the other is referred to as a second range. The second range stores values in a range that does not overlap with the first range. The recording devices 10 include devices with a model ID assigned in the first range, and devices with a model ID assigned in the second range. Generally, the recording devices 10 to which a model ID in the first range is assigned are, for example, older devices than recording devices 10 having a model ID in the second range. In this embodiment, therefore, a recording device 10 with a model ID in the first range is an older model of device, and a recording device 10 with a model ID in the second range is a new device model. The first range is a range of values that can be expressed with 7 bits, that is, the range 0 to 127. The second range of values, which are outside this first range, is 128 to 65,535. These ranges are simply one example, and different ranges may be used. For example, the first range could be a fixed length such as one byte according to the communication protocol, and the second range could be a variable length. Compatibility with existing older models, and compatibility with new future models having a longer model ID, is therefore possible.

In one aspect, the model ID is expressed by a numeric value whether it is a value in the first range or a value in the second range. Model IDs in the first range and model IDs in the second range are common in this respect. However, in this embodiment, different data formats are used when sending these model IDs from the recording device 10 to the host device 20. Model IDs in the first range are communicated using a data format expressed with numbers. Model IDs in the second range are communicated using a data format expressed by a text string.

Figure 3:
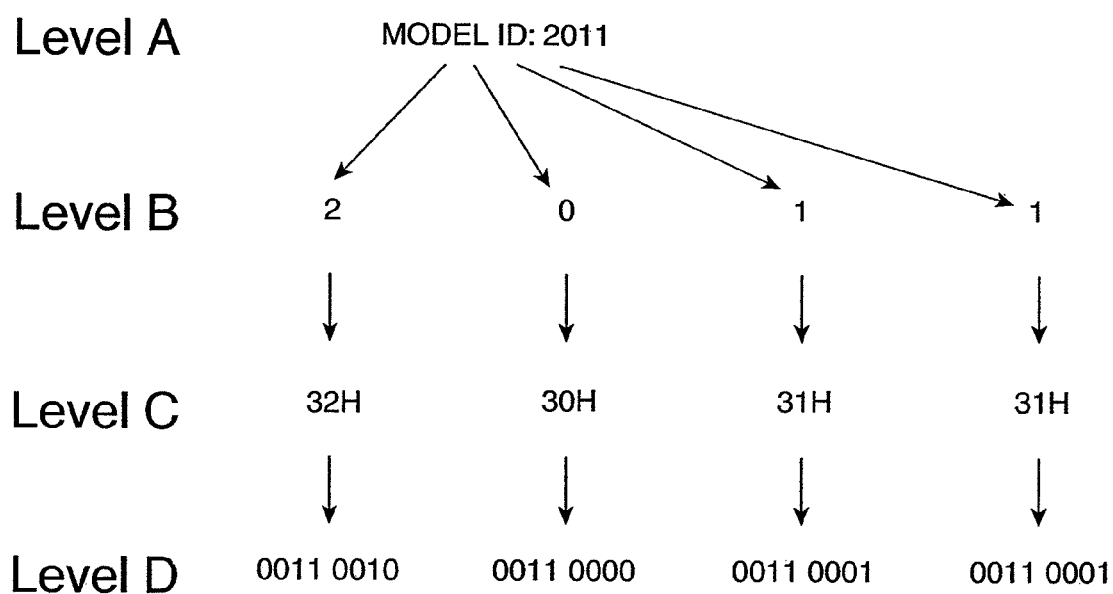
FIG. 3 describes a specific example of the data format when a model ID contained in a second range is sent from a recording device 10 to a host device 20.

FIG. 3 shows an example of the data format used to send a model ID in the second range from the recording device 10 to the host device 20 when using a model ID of 2011 for example. Level A of FIG. 3 shows the numbers of the model ID. Level B of FIG. 3 shows the value of each digit of the model ID. As shown in Level B of FIG. 3, the value of each digit of the model ID is acquired as a letter. Level C of FIG. 3 shows the character code for the value of each digit of the model ID. As shown in Level C of FIG. 3, the letter for the value of each digit of the model ID is converted to a character code. Hexadecimal ASCII codes are used as the character codes in Level C. The character codes are not limited to ASCII codes, however. Level D of FIG. 3 shows the bit sequence of the character code for each digit. As shown in the figure, model IDs contained in the second range are sent as alphabetic strings from the recording device 10 to the host device 20.

Figure 4:
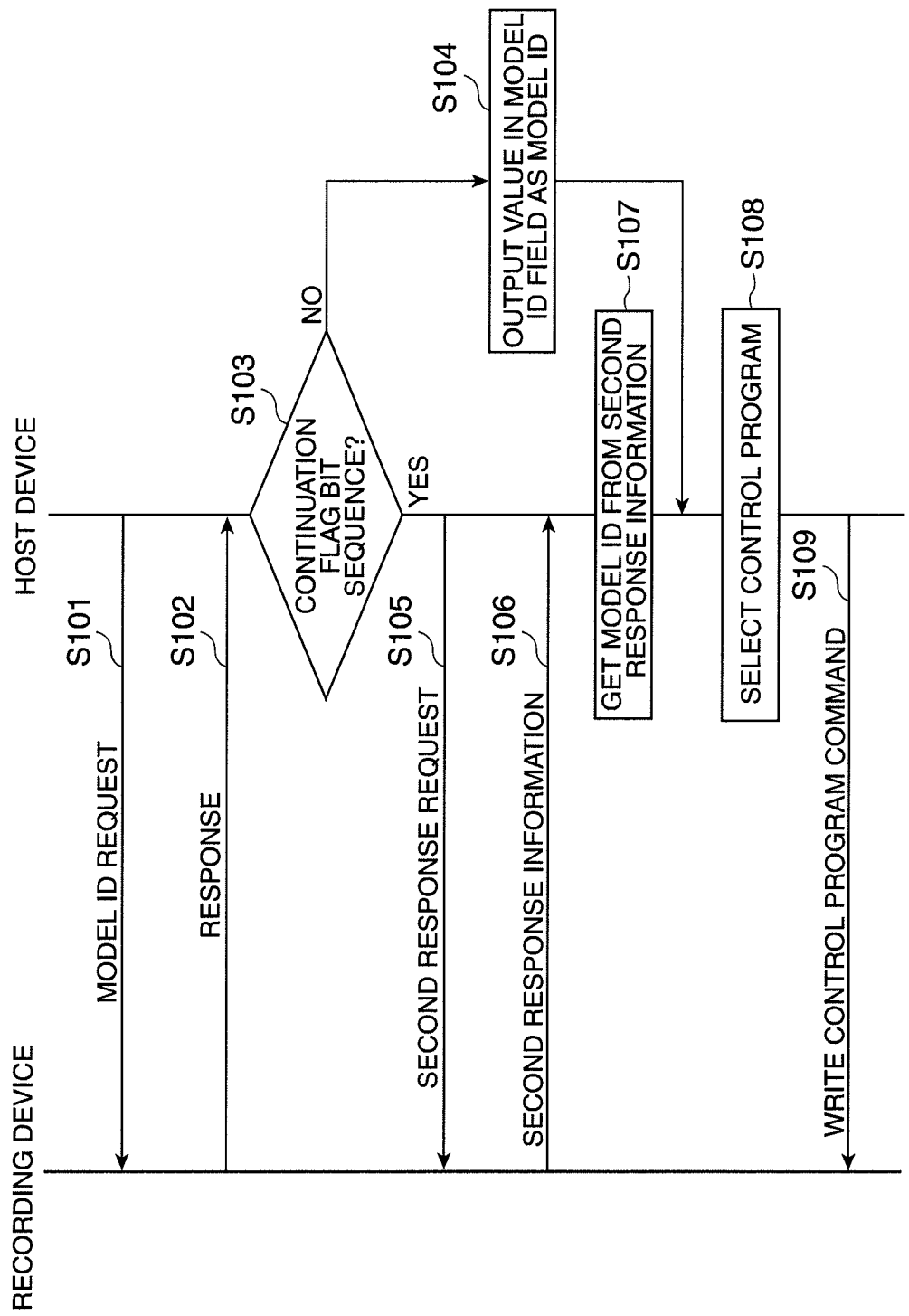
FIG. 4 is a flow chart of the process whereby the host device 20 acquires a model ID from the recording device 10 in the recording system 1.

FIG. 4 is a flow chart of the process whereby the host device 20 acquires a model ID from a given recording device 10 in the recording system 1 (the recording device having model ID information from either the first range or the second range).

The model ID acquisition unit 202 of the host device 20 first sends a model ID request to the recording device 10 (step S101). This model ID request is data requesting transmission of the device model ID to the host device 20. The model ID request is expressed by a code (command) predefined according to the recording device 10 and host device 20. The model ID request is a code used with an older model of a recording device 10 to which a model ID in the first range is assigned, and is a code that can also be used with a new model of recording device 10 to which a model ID in the second range is assigned. Typically, the model ID request is a command that is already used to acquire the model ID from older devices (recording devices 10 having a model ID in the first range). As a result, there is no need to change the format of the model ID request on older models having model ID information from the first range.

When a model ID request is received, the control unit 105 of the recording device 10 sends a response (step S102). The response information sent from the recording device 10 to the host device 20 is written in a common 7-bit data format (first format) regardless of whether the model ID assigned to the recording device 10 is in the first range or second range. Like the model ID request described above, the response is expressed using a format already used by old models. As a result, there is no need to change the format of the response information on old models.

The values contained in the response differ according to whether the model ID is in the first range or the model ID is in the second range. The control unit 105 of a recording device 10 that is an older model having a model ID in the first range of 0 to 127 reads the numeric value of the model ID from the model ID storage unit 102, and includes that value as the model ID in the response. For example, if the model ID is 127, the control unit 105 inserts 1111111, which is a 7-bit binary bit sequence, in the model ID field of the response. The model ID field is an area of a fixed-length bit sequence for inserting the model ID in the bit sequence representing the response.

The control unit 105 of the recording device 10 to which a model ID in the second range is assigned inserts a bit sequence ("continuation flag bit sequence" below), which is a value (specific information) signaling that the value of the model ID of the device is in the second range, in the model ID field of the response. This continuation flag bit sequence is a bit sequence with a fixed number of bits, and expresses a value that is not currently used as a model ID in the first range even on old models. For example, the continuation flag bit sequence could be a bit sequence representing the value 10. In other words, the continuation flag bit sequence is a bit sequence denoting a value telling the host device 20 that there is more information (e.g. second response information relating to model information outside a specific range) following transmission of the response. Because this bit sequence could simply be a value signaling that the model ID of the device is a value in the second range, a 1-bit flag could also be used.

Yet further, the continuation flag bit sequence could be assigned to the position of the model ID field to which the model ID of old models is assigned.

Further alternatively, part of a model ID in the second range could be inserted to the position of another model ID field after the continuation flag bit sequence is assigned. The remaining model ID can be sent in the second response information described below (or alternatively in additional responses as needed).

When the response information is received, the model ID acquisition unit 202 of the host device 20 reads the bit sequence of the model ID field in the received response information, and determines if the value of the model ID is the continuation flag bit sequence (step S103). If the value in the model ID field is not the continuation flag bit sequence (step S103 returns No), the model ID acquisition unit 202 outputs the value in the model ID field directly as the value of the model ID. In this embodiment of the invention the model ID value is output to the control program writing unit 204.

If the value of the model ID field is the continuation flag bit sequence (step S103 returns Yes), the model ID acquisition unit 202 sends a second response request to the recording device 10 (step S105). This second response request is data requesting transmission of second response information to the host device 20. The second response information is data associated with a model ID in the second range. Because the second response request is sent only to recording devices 10 having a model ID in the second range, a recording device 10 with a model ID in the first range does not need to be capable of processing the second response request and can simply discard the request, such that no particular problem results. As a result, older models of devices do not need to be modified to handle the second response request.

Note that evaluation is faster when the continuation flag bit sequence is assigned to a specific position in the model ID field.

The control unit 105 of a recording device 10 having model ID information in the second range receives the second response request and returns second response information associated with model information outside a specific range (step S106). The second response information sent from the recording device 10 to the host device 20 is written in a format (second format) defined for a recording device 10 of which the model ID assigned to the recording device 10 is in the second range. The second response information may include a variable-length model ID text field, such that a bit sequence containing the character code of each digit in the model ID in the same sequence as the digits of the model ID can be inserted in the model ID text field.

More specifically, the control unit 105 reads the model ID from the model ID storage unit 102, and generates the second response information by generating character codes according to the model ID that was read and inserting the character codes to the model ID text field. The control unit 105 then sends the second response information to the host device 20. Typically, at this time, the control unit 105 inserts a specific value signaling the end of the second response information to the end of the second response information. The null value 00H, for example, could be inserted to the end. By inserting this specific value to the end of the second response information, the host device 20 can accurately recognize the end of the model ID text field and the end of the second response information even when the model ID text field has a variable length, that is, when the bit length of the second response information is variable.

When the second response information is received, the model ID acquisition unit 202 of the host device 20 converts the character codes of the second response information to acquire the numeric value of the model ID (step S107). More specifically, the model ID acquisition unit 202 extracts the value in the model ID text field from the second response information, and acquires the number of each digit of the model ID by recognizing the character codes. The model ID acquisition unit 202 then acquires the numeric value of the model ID by a data conversion operation that arranges the values of the digits in order. After acquiring the model ID, the model ID acquisition unit 202 outputs the acquired model ID to the control program writing unit 204.

The control program writing unit 204 then selects and reads from the control program database storage unit 203 a control program corresponding to the model ID output from the model ID acquisition unit 202 (step S108). The control program writing unit 204 then sends the read control program with a control program write command to the recording device 10 (step S109). When the control program write command is received, the control unit 105 of the recording device 10 updates the control program by writing the control program received with the write command to the control program storage unit 103. Note that the control program that controls program updates is stored to an area in control program storage unit 103 that is not overwritten.

The recording system 1 described above allows a device to acquire model ID information from both devices having model IDs from a first range of values that are currently used, and from devices to having model IDs from a second range that does not overlap the first range, without needing to substantially change the configuration of devices to which a model ID in the first range is assigned.

The effect of the invention in many embodiments is described further below.

The recording system 1 uses values in a first range and values in a second range as model IDs. As a result, the number of model IDs can be increased and the number of models can be increased as compared with systems that only use model ID values in the first range.

Advantageously, the processes that are executed first when acquiring the model ID in an exemplary recording system 1 (that is, sending a model ID request and sending response information) are processes that are typically already used with old models. Model ID acquisition with old models is completed by these two processes, and additional processing (that is, step S105 and step S106) is not required. Information (specific information) for telling the host device 20 that the model ID is in the second range is inserted to the model ID field of the response. There is no need to change the model ID field of the response in this case. As a result, there is no need to change the configuration of old models in order for the host device 20 to acquire the model ID. New models also execute the same process as old models described above. As a result, the host device 20 can successfully execute the model ID acquisition process for both old and new recording devices 10 without knowing in advance whether the recording device 10 is an old model or a new model.

Other Embodiments

The recording device 10 described above is but one example of a peripheral device that sends model ID information to the host device 20. Peripheral devices that send model ID information to the host device 20 using an exemplary system are not limited to recording devices. For example, the peripheral device could be a display device, communication device, or auxiliary storage, for example, or a combination of devices.

The process whereby the host device 20 acquires the model ID is also not limited to a process that overwrites the control program, and could be any other suitable process, including a command for a recording process using the recording unit 104.

The model ID storage unit 102 of the recording device 10 to which a model ID in the second range is assigned could store a model ID expressed by character codes together with a model ID expressed by numbers. In this case, the control unit 105 does not need to convert the model ID from a numeric value to character codes when generating the second response information.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing device having a model ID and that is capable of communicating with a host computer and comprising:
    a print unit;
    a model information storage unit that stores model information for the printing device, wherein the model information corresponds to the model ID;
    a communication unit that receives information from and sends information to the host computer; and
    a control unit configured to:
        (i) receive a first transmission request from the host computer for model information within a first range in a first format;
        (ii) send the model information through the communication unit to the host computer in the first format in response to the first transmission request, wherein
            when the model ID is within the first range in the first format, which corresponds to a legacy device model ID, sending the model information comprises sending the model ID to the host computer, and
            when the model ID exceeds the first range within the first format, which corresponds to an advanced device model ID, sending the model information comprises sending specific information in the first format in the first range of values indicating there is model information in a second range of values in response to the transmission request;
        (iii) receive a second transmission request from the host computer for model information exceeding the first range after sending the specific information when the model ID exceeds the first range in the first format;
        (iv) send the model information exceeding the first range to the host computer from which the advanced device model ID is obtained; and
        (v) receive a write program command of a control program selected based on the model ID of the printing device.

2. The printing device described in claim 1, wherein:
the control unit is further configured to send the specific information recorded on a part of a portion of the model information storage unit assigned to the model information in the first format when the model information is outside the first range of values.

3. The printing device described in claim 1, wherein:
the control unit is further configured to send model information outside the first range of values when the communication unit receives a transmission request for model information outside the specific range from the computer after sending the specific information.

4. The printing device described in claim 3, wherein:
the first format is a fixed length, and the model information outside the first range of values has a variable length.

5. The printing device described in claim 3, wherein:
the control unit sends the model information outside the first range of values in a second format that is different from the first format.

6. A reading device having a model ID and that is capable of communicating with a host computer and comprising:
    a model information storage unit that stores model information for the reading device, wherein the model information corresponds to the model ID;
    a communication unit configured to receive information from and send information to the host computer; and
    a control unit coupled to the communication unit and configured to:
        (i) receive a first transmission request from the host computer for model information within a first range in a first format;
        (ii) send the model information through the communication unit to the host computer in the first format in response to the first transmission request, wherein
            when the model ID is within the first range in the first format, which corresponds to a legacy device model ID, sending the model information comprises sending the model ID to the host computer, and
            when the model ID exceeds the first range within the first format, which corresponds to an advanced device model ID, sending the model information comprises sending specific information in the first format in the first range of values indicating there is model information in a second range of values in response to the transmission request;
(iii) receive a second transmission request from the host computer for model information exceeding the first range after sending the specific information when the model ID exceeds the first range in the first format;
(iv) send the model information exceeding the first range to the host computer from which the advanced device model ID is obtained; and
(v) receive a write program command of a control program selected based on the model ID of the reading device.

7. A multifunction device having a model ID and that can communicate with a host computer, comprising:
a recording unit;
a reading unit;
a model information storage unit that stores model information for the multi-function device, wherein the model information corresponds to the model ID;
a communication unit configured to receive information from and send information to the host computer; and
a control unit coupled to the communication unit and configured to:
(i) receive a first transmission request from the host computer for model information within a first range in a first format;
(ii) send the model information through the communication unit to the host computer in the first format in response to the first transmission request, wherein
when the model ID is within the first range in the first format, which corresponds to a legacy device model ID, sending the model information comprises sending the model ID to the host computer, and
when the model ID exceeds the first range within the first format, which corresponds to an advanced device model ID, sending the model information comprises sending specific information in the first format in the first range of values indicating there is model information in a second range of values in response to the transmission request;
(iii) receive a second transmission request from the host computer for model information exceeding the first range after sending the specific information when the model ID exceeds the first range in the first format;
(iv) send the model information exceeding the first range to the host computer from which the advanced device model ID is obtained; and
(v) receive a write program command of a control program selected based on the model ID of the multifunction device.

8. A method of controlling a printing device having a model ID and that has a print unit and is capable of communicating with a host computer, comprising steps of:
receiving a first transmission request for printing device model information from the computer;
sending the model information in a first format to the host computer, when the model information is within a first range of values, the model information being within the first range corresponding to a legacy printing device model ID; and
sending, to the host computer, specific information in the first format in the first range of values indicating there is model information exceeding the first range when the model information exceeds the first range, the model information exceeding the first range corresponding to a newer printing device model ID;
receiving, from the host computer, a second transmission request for printing device model information when the model information exceeds the first range;
sending, to the host computer, the model information exceeding the first range from which the newer printing device model ID is obtained; and
receiving a write program command of a control program selected based on the model ID of the printing device.

9. The method of controlling a printing device described in claim 8, further comprising a step of:
assigning and sending the specific information to the computer in the first format in the first range when the model information is outside the first range, the specific information being recorded on a part of a portion of a model information memory storage unit assigned to the model information, in the first format when the model information exceeds the first range.

10. The method of controlling a printing device described in claim 8, further comprising a step of:
sending model information outside the first range in response to a transmission request for model information outside the first range received from the computer after sending the specific information.

11. The method of controlling a printing device described in claim 10, wherein:
the first format is a fixed length, and the model information exceeding the first range has a variable length.

12. The method of controlling a printing device described in claim 10, wherein:
model information exceeding the first range is sent in a second format that is different from the first format.

13. A method of controlling a reading device having a model ID and that has a reading unit and is capable of communicating with a host computer, comprising steps of:
receiving a first transmission request for reading device model information from the computer;
sending the model information to the host computer in a first format in a first range of values when the model information is within the first range of values, wherein the model information in the first format a bit sequence within the specific range and corresponds to a legacy reading device model ID; and
sending, to the host computer, specific information in the first format in the first range of values indicating there is model information exceeding the first range when the model information exceeds the first range, wherein the model information exceeding the first range corresponds to a newer reading device model ID and the specific information is continuation flag bit sequence;
receiving, from the host computer, a second transmission request for reading device model information when the model information exceeds the first range;
sending, to the host computer, the model information exceeding the first range from which the newer reading device model ID is obtained; and
receiving a program command of a program selected based on the model ID of the reading device.

14. A method of controlling a multifunction device having a model ID and that has a recording unit and a reading unit and is capable of communicating with a host computer, comprising steps of:
receiving a first transmission request for multifunction device model information from the computer;
sending the model information in a first format in a first range of values when the model information is within the first range, the model information in the first format being within the first range corresponding to a legacy multifunction device model ID; and sending, to the host computer, specific information in the first format in the first range of values indicating there is model information exceeding the first range when the model information exceeds the first range, the model information exceeding the first range corresponding to a newer multifunction device model ID;

receiving, from the host computer, a second transmission request for multifunction device model information when the model information exceeds the first range;

sending, to the host computer, the model information exceeding the first range from which the newer multifunction device model ID is obtained; and receiving a program command of a control program selected based on the model ID of the multifunction device.

15. The printing device described in claim 5, wherein the first format comprises only numbers and wherein the second format includes one or more text characters.

16. The printing device described in claim 15, wherein the second format includes a text string.

17. The method of controlling a printing device described in claim 10, wherein the first format comprises only numbers and wherein the second format includes one or more text characters.

18. The method of controlling a printing device described in claim 17, wherein the second format includes a text string.

19. The method of controlling a printing device described in claim 17 further comprising:

converting the model information when exceeding the first range into the second format.

20. The method of controlling a printing device described in claim 19 wherein converting the model information comprises converting information between digits and character codes.

* * * * *